US008270522B2

(12) United States Patent
Xie et al.

(10) Patent No.: US 8,270,522 B2
(45) Date of Patent: Sep. 18, 2012

(54) JOINT CHANNEL ESTIMATION AND MODULATION DETECTION

(75) Inventors: Kai Xie, Santa Clara, CA (US); Sattar Elyasi, San Jose, CA (US)

(73) Assignee: Altobridge Limited, Tralee, Co. Kerry (IE)

( * ) Notice: Subject to any disclaimer, the term of this patent is extended or adjusted under 35 U.S.C. 154(b) by 554 days.

(21) Appl. No.: 12/422,545

(22) Filed: Apr. 13, 2009

(65) Prior Publication Data

US 2010/0260281 A1 Oct. 14, 2010

(51) Int. Cl.
*H04L 27/18* (2006.01)

(52) U.S. Cl. ......... 375/279; 375/324; 375/259; 375/340

(58) Field of Classification Search ................. 375/279, 375/340, 259, 271, 322; 370/215; 329/315, 329/300, 304
See application file for complete search history.

(56) References Cited

U.S. PATENT DOCUMENTS

| 4,183,054 A | 1/1980 | Patisaul et al. |
|---|---|---|
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,245,611 A * | 9/1993 | Ling et al. ..................... 370/347 |

(Continued)

FOREIGN PATENT DOCUMENTS

EP 0391597 10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner* — Shuwang Liu
*Assistant Examiner* — Helene Tayong
(74) *Attorney, Agent, or Firm* — Bryan Cave LLP

(57) ABSTRACT

A receiver comprises a demodulator to estimate channel impulse response and timing synchronization information for the received signal and to select a modulation technique for demodulating the received signal; and a channel decoder to produce a binary sequence from the received signal demodulated according to the selected modulation technique; wherein the demodulator: demodulates the received signal according to a first modulation technique and a second modulation technique to produce a first demodulated signal and a second demodulated signal, respectively; calculates a minimum distance between a first reconstructed signal including the training sequence and the first demodulated signal to estimate the channel impulse response and timing synchronization information; calculates a minimum distance between a second reconstructed signal including the training sequence and the second demodulated signal to estimate the channel impulse response and timing synchronization information; compares the minimum distance corresponding to the first demodulated signal with the minimum distance corresponding to the second demodulated signal; and selects the modulation technique, from among the first and second modulation techniques, that corresponds to the smaller minimum distance.

10 Claims, 3 Drawing Sheets

U.S. PATENT DOCUMENTS

| | | | |
|---|---|---|---|
| 5,321,849 A | 6/1994 | Lemson | |
| 5,339,184 A | 8/1994 | Tang | |
| 5,852,630 A * | 12/1998 | Langberg et al. | 375/219 |
| 6,907,092 B1 * | 6/2005 | Yakhnich et al. | 375/346 |
| 6,944,242 B2 * | 9/2005 | Yakhnich et al. | 375/341 |
| 7,369,873 B2 * | 5/2008 | Brobston et al. | 455/552.1 |
| 2005/0135507 A1 * | 6/2005 | Chang et al. | 375/316 |
| 2006/0203943 A1 * | 9/2006 | Scheim et al. | 375/341 |
| 2007/0160010 A1 * | 7/2007 | Maltsev et al. | 370/332 |
| 2008/0279300 A1 * | 11/2008 | Walker et al. | 375/267 |
| 2010/0323685 A1 * | 12/2010 | Lopez et al. | 455/422.1 |

FOREIGN PATENT DOCUMENTS

| | | |
|---|---|---|
| WO | 9115927 | 10/1991 |
| WO | WO0106724 | 1/2001 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

* cited by examiner

JOINT CHANNEL ESTIMATION AND MODULATION DETECTION

BACKGROUND

In a digital communication system that uses a coherent receiver, the receiver typically estimates the channel impulse response (CIR) and channel delay in order to perform coherent demodulation of a received signal. Where such coherent systems use wireless communication links, the CIR is not constant and changes with the environment as the transmitter or the receiver change location. For the same reason, the signal delay is not constant and changes slowly. Thus, in wireless coherent systems, the receiver typically must dynamically update its estimates of the CIR and channel delay.

SUMMARY

In one embodiment a receiver that receives a received signal from a communication link is received. The received signal comprises a training sequence modulated onto a carrier. The receiver comprises a demodulator to estimate channel impulse response and timing synchronization information for the received signal and to select a modulation technique for demodulating the received signal; and a channel decoder to produce a binary sequence from the received signal demodulated according to the selected modulation technique; wherein the demodulator: demodulates the received signal according to a first modulation technique and a second modulation technique to produce a first demodulated signal and a second demodulated signal, respectively; calculates a minimum distance between a first reconstructed signal including the training sequence and the first demodulated signal to estimate the channel impulse response and timing synchronization information; calculates a minimum distance between a second reconstructed signal including the training sequence and the second demodulated signal to estimate the channel impulse response and timing synchronization information; compares the minimum distance corresponding to the first demodulated signal with the minimum distance corresponding to the second demodulated signal; and selects the modulation technique, from among the first and second modulation techniques, that corresponds to the smaller minimum distance.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 1:
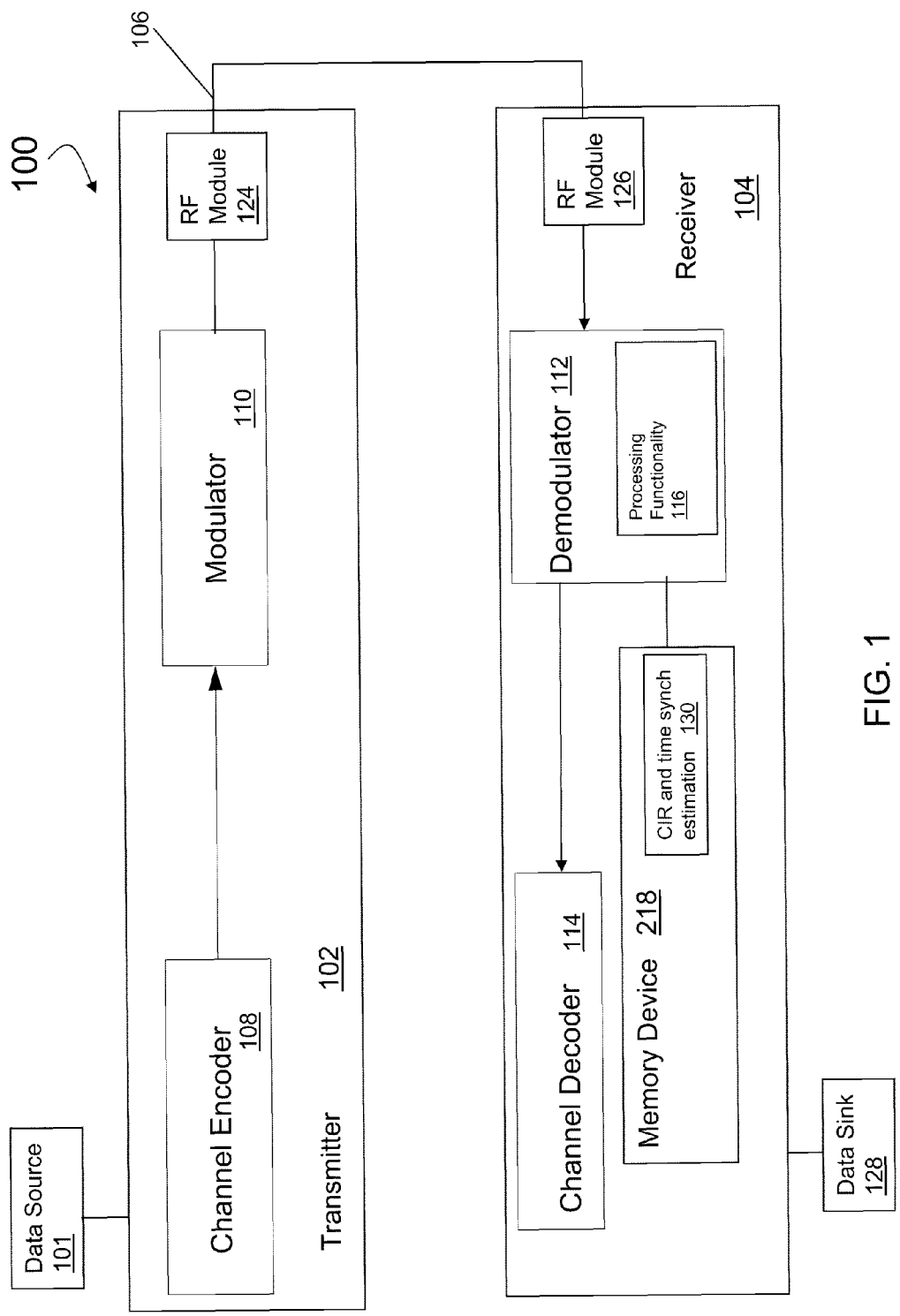
FIG. 1 is a block diagram of one embodiment of a communication system.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

FIG. 1 is a block diagram of one embodiment of a communication system 100. Communication system 100 includes a transmitter 102 and a receiver 104. Transmitter 102 is operable to transmit modulated communication signals over link 106 to receiver 104. Receiver 104 demodulates the communication signals and performs error correction routines to reduce the effects of noise in the received modulated signal.

Although only the transmitter 102 and the receiver 104 are shown at the respective ends of the communication link 106 in FIG. 1, it is to be understood that typically each end of the communication link 106 will have both a transmitter and receiver (to support bi-directional communication). Also, although the transmitter 102 and receiver 104 are shown as separate devices in FIG. 1, in some implementations, the receiver and transmitter at each end of the link 106 are integrated into a single device (sometimes referred to as a "transceiver"). Thus, in such implementations, each of transmitter 102 and receiver 104 include both a transmitter and receiver integrated into a single device.

Transmitter 102 comprises a channel encoder 108 and a modulator 110. Channel encoder 108 encodes data bits received from a data source 101 to produce a binary sequence. The binary sequence is output from the channel encoder 108 to modulator 110. Modulator 110 is operable to map each of the bits in the binary sequence to one of a plurality of symbols in a constellation such that each symbol represents a plurality of bits. For example, in some embodiments, modulator 110 is operable to map the binary sequence using a phase-shift keying (PSK) modulation scheme, such as a Global System for Mobile communications (GSM) 8-PSK modulation scheme or a Gaussian Minimum Shift Keying (GMSK) modulation scheme. Although specific exemplary modulation schemes are mentioned herein, it is to be understood that other modulation schemes can be used which map a binary sequence of bits to a plurality of symbols which each represent a plurality of bits.

Modulator 110 outputs a modulated sequence of symbols representing the binary sequence and a training sequence. The training sequence is a set of symbols known by the receiver which are used to enable the receiver to determine the channel impulse response and modulation technique as described below. The modulated sequence of symbols (also referred to herein as the transmitted signal or modulated signal) is transmitted to receiver 104 via communication link 106. Link 106 comprises any wired or wireless medium suitable for communication signals, such as, but not limited to, fiber optic cable, coaxial cable, twisted pair cable, and wireless radio frequency (RF) communication signals. Hence, modulator 110 is operable to modulate the symbol sequence for transmission over link 106. For example, in this exemplary embodiment, the transmitter 102 further comprises an RF module 124. The RF module 124 receives the modulated sequence produced by the modulator 110 and produces an RF signal suitable for transmission on the link 106. For example, in one implementation where the modulator 110 outputs a digital baseband modulated signal having in-phase (I) and quadrature (Q) components, the RF module 124 performs an up-conversion operation to up-convert the baseband signal to an appropriate RF frequency and performs a digital-to-analog (D/A) operation to produce an analog signal suitable for transmission. In addition, in some embodiments, the wireless RF signal is transmitted to the receiver 104 in a licensed RF spectrum for cellular communication. For example, GSM communication signals are commonly transmitted in one of the 1.9 GHz frequency band, the 900 MHz frequency band, and the 1.8 GHz frequency band in the United States.

During transmission over link 106, the transmitted symbol sequence is subject to various sources of delays and noise. For example, movement of receiver 104 and/or transmitter 102 introduces varying delays in the transmission time of the symbol sequence. In addition, reflections off buildings and/or other objects results in multi-path fading, as known to one of skill in the art. Thus, in order to perform coherent demodulation, receiver 104 estimates the channel impulse response (CIR) and timing synchronization for the received symbol sequence based on analysis of the training sequence.

In particular, the receiver 104 comprises an RF module 126, a demodulator 112 and a channel decoder 114. The RF module 126 receives the modulated RF signal transmitted on the link 106 and produces a digital baseband signal, comprising the received symbol sequence (also referred to herein as the received signal), suitable for use by the demodulator 112. For example, in one implementation where the demodulator 112 is configured to receive a digital baseband modulated signal having I and Q components, the RF module 126 performs a down-conversion operation to down-convert the RF signal to baseband and to separate out the I and Q components. The RF module 126, in such an implementation, also performs an analog-to-digital (A/D) operation to produce digitized versions of the baseband signals suitable for use by the demodulator 112.

The receiver 104 is a coherent receiver and estimates the CIR in order to compensate for distortions in the receive signal caused by the channel. Processing functionality 116 in demodulator 112 estimates the CIR and timing synchronization of the received symbol sequence. In particular, processing functionality 116 correlates a copy of the known training sequence with the training sequence in the received symbol sequence to estimate the time synchronization and the CIR.

Figure 2:
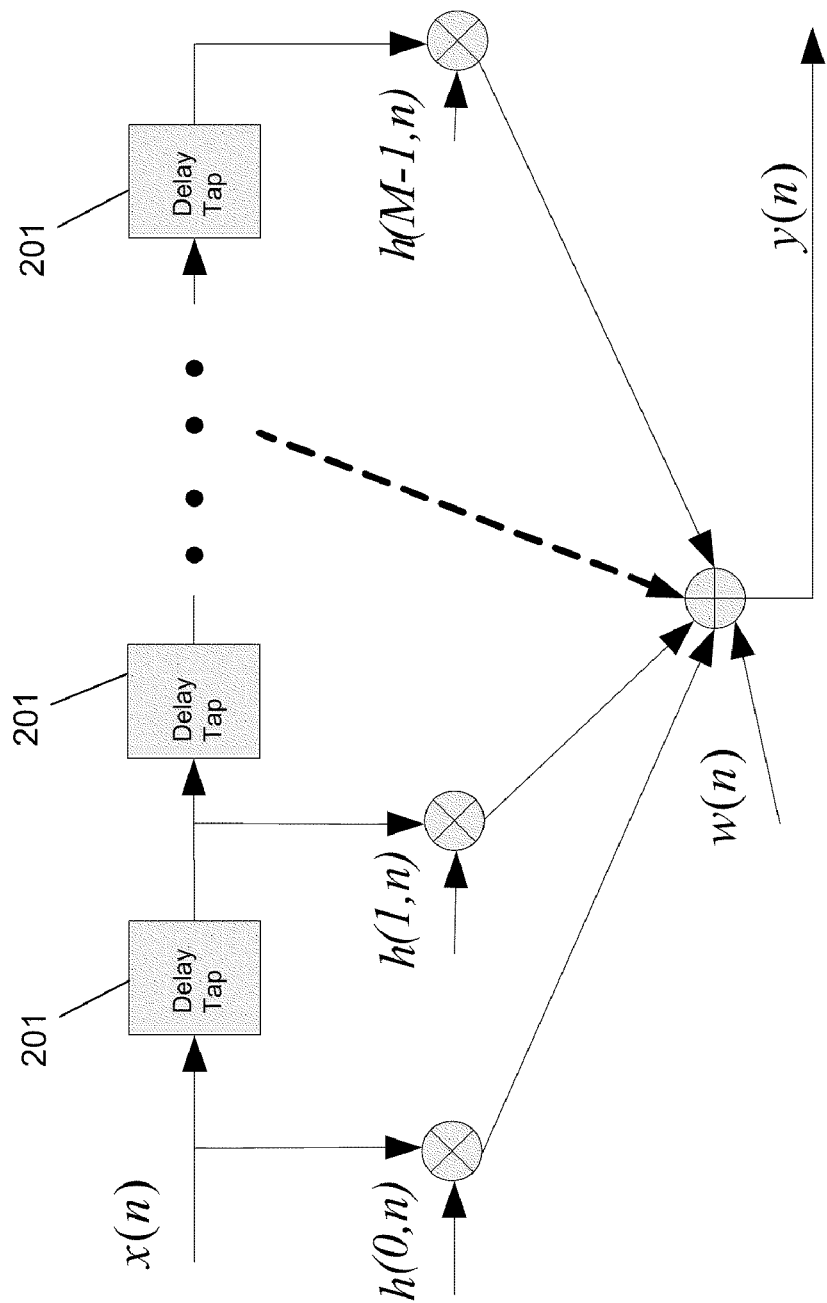
FIG. 2 is a block diagram of Finite Impulse Response Channel Model.

For example, the transmitted symbol sequence can be denoted as x(n), where n is the symbol index, the training sequence within the transmitted symbol sequence can be denoted as $x_{TSC}(i)$, where i is the training symbol index, and the received symbol sequence can be denoted as y(n). Since signal x(n) passes through a frequency selective and slowly timing varying channel with additive white noise, the received signal y(n) may be different from x(n). The received signal y(n) can be modeled as a finite impulse response (FIR) filter with multiple inputs, as shown in FIG. 2. In particular, the received signal is modeled as the sum of white noise w(n), the transmitted symbol sequence x(n), and a plurality of delayed versions (time offsets) of x(n). Each of the delayed versions of x(n) passes from one of a plurality of delay taps 201, each delay tap 210 having a different delay. The delay taps 210 represent delays from the multiple paths which x(n) travels. Hence, y(n) can be described by the following equation.

$$y(n) = \sum_{m=0}^{\infty} x(n-m)h(m,n) + w(n) \quad \text{(eq. 1)}$$

$$= \sum_{m=0}^{N-1} x(n-m)h(m,n) + w(n)$$

In the above equation, m is the delay tap index, w(n) is Gaussian white noise, h(m,n) is the fading coefficient of each delay tap and N is the maximum number of delays or time offsets. In a short time period such as the duration of one burst, it is assumed that h(m,n) is a constant and then the channel coefficient can be denoted as h(m). Hence, the received training sequence can be denoted using the following matrix:

$$X_{TSC} = \begin{bmatrix} x_{tsc}^0 & x_{tsc}^1 & \cdots & x_{tsc}^{N-1} \\ x_{tsc}^1 & x_{tsc}^2 & \cdots & x_{tsc}^N \\ \vdots & \vdots & \vdots & \vdots \\ x_{tsc}^{M-N} & x_{tsc}^{M-N+1} & \cdots & x_{tsc}^{M-1} \end{bmatrix}$$

In the above matrix, M is the total number of symbols in the training sequence. In some embodiments, the total number of symbols in the training sequence is limited to prevent inter-symbol interference (ISI). For example in some implementations in a Global System for Mobile communications (GSM) environment, the total number of symbols in the training sequence is limited to 26 minus the total number of delays or time offsets, N. Processing functionality 116, thus, determines the timing synchronization and channel estimation by solving the equation:

$$[\hat{h}, \hat{n}] = \underset{h,n}{\operatorname{argmax}} P(y \mid h, n) \quad \text{(eq. 2)}$$

In the above equation, $\hat{h}$ and $\hat{n}$ are the values which maximize the probability of correctly reconstructing the received signal y(n). For each time step, processing functionality 116 determines $\hat{h}$ as shown in the following equation.

$$\hat{h}_n = (X_{TSC}^T * X_{TSC})^{-1} * X_{TSC}^T * y_n^{M+n-1}, \text{ where}$$

$$y_n^{M+n-1} = [y_n, y_{n+1}, y_{n+2} \cdots y_{n+M-1}] \quad \text{(eq. 3)}$$

The calculated $\hat{h}_n$ are then used to reconstruct the received symbol sequence. The reconstructed signal is described by the equation:

$$\hat{y}_{n+l} = \sum_{m=0}^{N-1} x_{TSC}^{l+N-1-m} \hat{h}_n(m), \text{ where } l = 0, 1, 2 \ldots M-1 \quad \text{(eq. 4)}$$

The minimum distance between the reconstructed signal and the received signal can then be calculated using the equation:

$$d_n^{M+n-1} = \|\hat{y}_n^{M+n-1} - y_n^{M+n-1}\|^2 \quad \text{(eq. 5)}$$

In the above equation, d is the distance between the received and reconstructed signals Equation 5 is solved so that $$\hat{n} = \operatorname*{argmin}_i d_i \text{ and } \hat{h} = \hat{h}_{\hat{n}}.$$

In other words, the $\hat{h}$, which is used as an estimate of the CIR, and $\hat{n}$, which is used to estimate the time synchronization, that correspond to the minimum distance are selected.

Additionally, the process described above is simplified, in some implementations, by selecting a training sequence in which consecutive symbols are orthogonal to one another. For example, in some implementations in a GSM environment, any different 16 consecutive bits in the training sequence are orthogonal to each other. This can be expressed as:

$$\sum_{k=0}^{15} x_{TSC}^{i+k} \cdot x_{TSC}^{j+k} = 0 \text{ for any } i \neq j$$

In such implementations, each row in the matrix defining the training sequence $X_{TSC}$ is orthogonal. Thus, only one value form each row is evaluated since the other values are cancelled when shifted. By using this property, the matrix inversion in equation 3 can be avoided, thereby simplifying the calculation. In other words, for each time offset, the reconstructed signal is correlated with $X_{TSC}^m = [x_{TSC}^m, x_{TSC}^{m+1}, \ldots, x_{TSC}^{m+15}]$. Thus, the estimation of the mth channel tap can be computed by:

$$\hat{h}_n(m) = \sum_{J=m}^{m+15} x_{TSC}^J \cdot y_{n+J} / 16. \quad (\text{eq. 6})$$

Furthermore, in some implementations, transmitter 102 can modulate the transmitted symbol sequence according to one of a plurality of modulation techniques. For example, in some implementations, the transmitted symbol sequence can be modulated according to 8 Phase Shift Keying (8-PSK) or Gaussian minimum shift keying (GMSK). In such implementations, receiver 104 determines which modulation technique was used by analyzing the received signal. In particular, receiver 104 leverages the calculations done to estimate the CIR and time synchronization to identify which modulation technique was used to modulate the received symbol sequence.

In particular, processing functionality 116 demodulates the received signal using both modulation techniques and estimates the CIR and time synchronization using the resultant demodulated signals. For example, processing functionality 116 de-rotates the received signal by $$\frac{3\pi}{8} \text{ for the 8-PSK modulation}$$

and by $$\frac{\pi}{2} \text{ for the GMSK modulation}$$

Processing functionality 116 then compares the calculated minimum difference corresponding to the 8-PSK modulation with the minimum distance calculated for the GMSK modulation. The modulation technique corresponding to the minimum calculated distance is selected as the modulation technique used in modulating the transmitted symbol sequence. The received symbol sequence demodulated with the selected modulation technique is then passed to the channel decoder 114. Channel decoder 114 decodes the demodulated signal to produce data bits and provides the decoded data bits to a data sink 128, such as, but not limited to, a mobile phone, television system, etc.

Processing functionality 116 can be implemented using software, firmware, hardware, or any appropriate combination thereof, as known to one of skill in the art. For example, processing functionality 116 can include or interface with hardware components and circuitry that support the demodulation of received symbol sequence y. By way of example and not by way of limitation, these hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA).

In one implementation of the embodiment shown in FIG. 1, at least a portion of the RF module 126, the demodulator 112, and/or the channel decoder 114 in receiver 104 are implemented in software that executes on a suitable programmable processor. For example, such a programmable processor can be implemented using a digital signal processor (DSP) that executes software that implements at least a portion of the functionality described herein as being performed by the RF module 126, the demodulator 112, and/or the channel decoder 114. Such software comprises a plurality of program instructions tangibly embodied on a processor-readable medium such as CIR and time sync estimation instructions 130 stored on memory 118. In other examples, the programmable processor is a part of another type of programmable device such as an ASIC or FPGA. Similarly, in one implementation of the transmitter 102 shown in FIG. 1, at least a portion of the RF module 124, the modulator 110, and/or the channel encoder 108 are implemented in software that executes on a suitable programmable processor.

The memory 118 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 3:
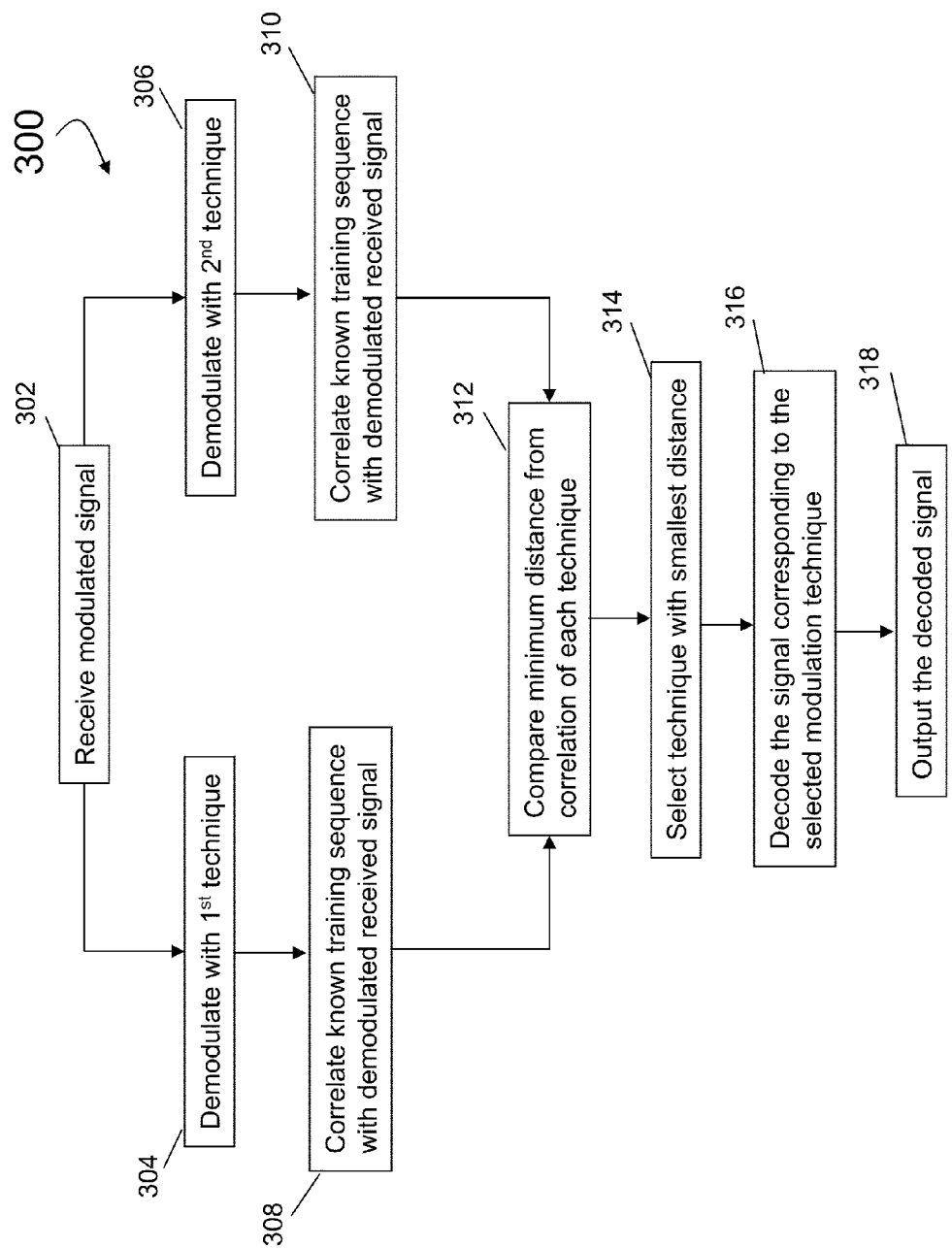
FIG. 3 is a flow chart of one embodiment of a method of processing a received signal.

FIG. 3 is a flow chart of one embodiment of a method 300 of processing a received signal. The embodiment of method 300 shown in FIG. 3 is described here as being implemented by demodulator 112 described above in connection with FIG. 1, though other embodiments are implemented in other ways. In this embodiment, all or some portions of method 300 are implemented in program instructions tangibly embodied on a processor-readable medium 118 and executed by processing functionality 116.

At block 302, the demodulator 112 receives a modulated signal. The signal is modulated according to one of a plurality of modulation techniques, such as 8-PSK or GMSK as described above. At block 304, the demodulator 112 demodulates the received signal according to a first modulation technique. For example, in one embodiment, the first modulation technique is 8-PSK and the demodulator 112 de-rotates the received symbols by $$\frac{3\pi}{8}.$$

At substantially the same time, the demodulator 112 demodulates the received signal according to a second modulation technique, at block 306. For example, in one embodiment, the second modulation technique is GMSK and the demodulator 112 de-rotates the received symbols by $$\frac{\pi}{2}.$$

At block 308, the demodulator 112 correlates a known training sequence with the signal demodulated according to the first modulation technique, as described above, to estimate the time offset and CIR that correspond to a minimum distance or difference between the known training sequence and the demodulated signal. Similarly, at block 310, the demodulator 112 correlates the known training sequence with the signal demodulated according to the second modulation technique to estimate the time offset and CIR that correspond to a minimum distance between the known training sequence and the demodulated signal.

At block 312, the demodulator 112 compares the minimum distance corresponding to the first modulation technique with the minimum distance corresponding to the second modulation technique. At block 314, the demodulator 112 selects the modulation technique that corresponds to the smaller minimum distance. At block 316, the demodulator 112 decodes the signal demodulated according to the selected modulation technique. At block 318, the demodulator 112 outputs the decoded signal to a data sink, such as a mobile phone or television.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A receiver that receives a received signal from a communication link, the received signal comprising a training sequence modulated onto a carrier, the receiver comprising: a demodulator to estimate channel impulse response and timing synchronization information for the received signal and to select a modulation technique for demodulating the received signal; and a channel decoder to produce a binary sequence from the received signal demodulated according to the selected modulation technique; wherein the demodulator: demodulates the received signal according to a first modulation technique and a second modulation technique to produce a first demodulated signal and a second demodulated signal, respectively; calculates a minimum distance between a first reconstructed signal including the training sequence and the first demodulated signal to estimate the channel impulse response and timing synchronization information; calculates a minimum distance between a second reconstructed signal including the training sequence and the second demodulated signal to estimate the channel impulse response and timing synchronization information; compares the minimum distance corresponding to the first demodulated signal with the minimum distance corresponding to the second demodulated signal; and selects the modulation technique, from among the first and second modulation techniques, that corresponds to a smaller minimum distance; wherein the first modulation technique is 8-Phase Shift Keying (8-PSK) and the second modulation technique is Gaussian minimum shift keying (GMSK); wherein the received signal is a wireless radio frequency (RF) signal and the receiver further comprises an RF module that down-converts the received signal; wherein the wireless RF signal is located in a licensed RF spectrum; wherein the training sequence in the received signal comprises a plurality of orthogonal symbols; and wherein the demodulator is operable to calculate the minimum distance between the first reconstructed signal and the first demodulated signal by correlating the training sequence in the first reconstructed signal with the training sequence in the first demodulated signal at each of a plurality of time offsets; and to calculate the minimum distance between the second reconstructed signal and the second demodulated signal by correlating the training sequence in the second reconstructed signal with the training sequence in the second demodulated signal at each of a plurality of time offsets.

2. The receiver of claim 1, wherein the plurality of orthogonal symbols comprise 16 consecutive symbols orthogonal with each other.

3. The receiver of claim 1, wherein the receiver is a Global System for Mobile communications (GSM) receiver.

4. A communication system, comprising: a transmitter operable to transmit a modulated signal, the transmitter comprising: a channel encoder to encode data bits; and a modulator to modulate the encoded data bits using one of a first modulation technique and a second modulation technique, wherein the modulator includes a training sequence in the modulated signal; and a receiver operable to receive the modulated signal, the receiver comprising: a demodulator to estimate channel impulse response and timing synchronization information for the received signal and to select a modulation technique for demodulating the received signal; and a channel decoder to produce a binary sequence from the received signal demodulated according to the selected modulation technique; wherein the demodulator: demodulates the received signal according to a first modulation technique and a second modulation technique to produce a first demodulated signal and a second demodulated signal, respectively; calculates a minimum distance between a first reconstructed signal including the training sequence and the first demodulated signal to estimate the channel impulse response and timing synchronization information; calculates a minimum distance between a second reconstructed signal including the training sequence and the second demodulated signal to estimate the channel impulse response and timing synchronization information; compares the minimum distance corresponding to the first demodulated signal with the minimum distance corresponding to the second demodulated signal; and selects the modulation technique, from among the first and second modulation techniques, that corresponds to a smaller minimum distance; and wherein the first modulation technique is 8-Phase Shift Keying (8-PSK) and the second modulation technique is Gaussian minimum shift keying (GMSKO); wherein the transmitter further comprises a radio frequency (RF) module that up-converts the modulated signal and the receiver further comprises a radio frequency module that down-converts the received signal; wherein the transmitter is operable to transmit a wireless RF signal and the receiver is operable to receive a wireless RF signal; wherein the transmitter is operable to transmit a wireless RF signal in a licensed RF spectrum.

5. The communication system of claim 4, wherein the training sequence comprises a plurality of orthogonal symbols.

6. The communication system of claim 5, wherein the plurality of orthogonal symbols comprise 16 consecutive symbols orthogonal with each other.

7. The communication system of claim 4, wherein the communication system is a Global System for Mobile communications (GSM) system.

8. A method of processing a received signal having a training sequence, the method comprising:
demodulating the received signal according to a first modulation technique to produce a first demodulated signal;
demodulating the received signal according to a second modulation technique to produce a second demodulated signal;
calculating a minimum distance between a first reconstructed signal including the training sequence and the first demodulated signal to estimate the channel impulse response and timing synchronization information;
calculating a minimum distance between a second reconstructed signal including the training sequence and the second demodulated signal to estimate the channel impulse response and timing synchronization information;
comparing the minimum distance corresponding to the first demodulated signal with the minimum distance corresponding to the second demodulated signal; and selecting the modulation technique, from among the first and second modulation techniques, that corresponds to a smaller minimum distance;
further comprising:
decoding the demodulated signal corresponding to the selected modulation technique; and
wherein the training sequence comprises a plurality of orthogonal symbols; and wherein calculating the minimum distance between the first reconstructed signal and the first demodulated signal comprises correlating the training sequence in the first reconstructed signal with the training sequence in the first demodulated signal at each of a plurality of time offsets; and
wherein calculating the minimum distance between the second reconstructed signal and the second demodulated signal comprises correlating the training sequence in the second reconstructed signal with the training sequence in the second demodulated signal at each of a plurality of time offsets and wherein the first modulation technique is 8-Phase Shift Keying (8-PSK) and the second modulation technique is Gaussian minimum shift keying (GMSK).

9. The method of claim 8, wherein the plurality of orthogonal symbols comprise 16 consecutive symbols orthogonal with each other.

10. A tangible processor-readable medium on which program instructions are embodied, wherein the program instructions are operable, when executed by at least one programmable processor included in a device that demodulates received communication signals, to cause the device to:
demodulate the received signal according to a first modulation technique to produce a first demodulated signal;
demodulate the received signal according to a second modulation technique to produce a second demodulated signal;
calculate a minimum distance between a first reconstructed signal including the training sequence and the first demodulated signal to estimate the channel impulse response and timing synchronization information;
calculating a minimum distance between a second reconstructed signal including the training sequence and the second demodulated signal to estimate the channel impulse response and timing synchronization information;
compare the minimum distance corresponding to the first demodulated signal with the minimum distance corresponding to the second demodulated signal; and
select the modulation technique, from among the first and second modulation techniques, that corresponds to a smaller minimum distance;
wherein the program instructions are further operable to cause the device to:
demodulate the received signal using 8-Phase Shift Keying (8-PSK) to produce the first demodulated signal; and
demodulate the received signal using Gaussian minimum shift keying (GMSK) to produce the second demodulated signal; and wherein the program instructions are further operable to cause the device to:
calculate the minimum distance between the first reconstructed signal and the first demodulated signal by correlating the training sequence in the first reconstructed signal with the training sequence in the first demodulated signal at each of a plurality of time offsets;
calculate the minimum distance between the second reconstructed signal and the second demodulated signal by correlating the training sequence in the second reconstructed signal with the training sequence in the second demodulated signal at each of a plurality of time offsets.

* * * * *